United States Patent
Chen et al.

(10) Patent No.: US 8,447,894 B2
(45) Date of Patent: May 21, 2013

(54) UPGRADING AN ELASTIC COMPUTING CLOUD SYSTEM

(75) Inventors: Weicai Chen, Hangzhou (CN); Bo Chen, Hangzhou (CN); Hua Kong, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/552,135

(22) Filed: Jul. 18, 2012

(65) Prior Publication Data

US 2012/0284432 A1 Nov. 8, 2012

Related U.S. Application Data

(63) Continuation of application No. PCT/US2012/020055, filed on Jan. 3, 2012.

(30) Foreign Application Priority Data

Jan. 5, 2011 (CN) .......................... 2011 1 0001297

(51) Int. Cl.
*G06F 3/00* (2006.01)
*G06F 13/00* (2006.01)

(52) U.S. Cl.
USPC ............ 710/17; 710/2; 710/5; 710/8; 710/32

(58) Field of Classification Search .................. None
See application file for complete search history.

(56) References Cited

U.S. PATENT DOCUMENTS

| | | | |
|---|---|---|---|
| 8,266,290 B2 | 9/2012 | Calder et al. | |
| 2004/0230963 A1* | 11/2004 | Rothman et al. | 717/168 |
| 2005/0144292 A1 | 6/2005 | Banga et al. | |
| 2007/0121645 A1* | 5/2007 | Dillow et al. | 370/395.54 |
| 2010/0180086 A1 | 7/2010 | Allen et al. | |
| 2010/0199037 A1 | 8/2010 | Umbehocker et al. | |
| 2010/0235887 A1 | 9/2010 | Burch et al. | |
| 2010/0332617 A1 | 12/2010 | Goodwin et al. | |
| 2011/0106990 A1 | 5/2011 | Higgs et al. | |
| 2011/0145836 A1 | 6/2011 | Wheeler et al. | |
| 2011/0161552 A1 | 6/2011 | Lund et al. | |
| 2011/0173038 A1 | 7/2011 | Moon et al. | |
| 2012/0086978 A1 | 4/2012 | Uchikawa | |
| 2012/0102183 A1 | 4/2012 | Murakami et al. | |
| 2012/0102572 A1 | 4/2012 | Murakami et al. | |
| 2012/0110394 A1 | 5/2012 | Murakami et al. | |

OTHER PUBLICATIONS

PCT Search Report mailed Apr. 30, 2012 for PCT application No. PCT/US12/20055, 10 pages.

* cited by examiner

*Primary Examiner* — Scott Sun
(74) *Attorney, Agent, or Firm* — Lee & Hayes, PLLC

(57) ABSTRACT

A server of an elastic computing cloud system includes a block device driver apparatus and at least a block device service apparatus. The server implements a hot deployment for a storage service, such that an upgrade of the storage service may be performed without interrupting the storage service. The block device driver apparatus maintains a waiting queue and a pending queue for each storage service. In response to determining a storage service will perform an upgrade, the block device driver apparatus stops processing data write/read requests that are maintained in the pending queue for the service, and puts the data write/read requests that are currently processed in the pending queue back to the waiting queue for re-dispatching, thus realizing completion of processing the upgrade of the storage service in the elastic computing cloud system without interrupting the storage service.

20 Claims, 8 Drawing Sheets

UPGRADING AN ELASTIC COMPUTING CLOUD SYSTEM

CROSS REFERENCE TO RELATED PATENT APPLICATIONS

This application is a continuation of PCT International Patent Application No. PCT/US2012/020055, filed Jan. 3, 2012, which claims foreign priority to Chinese Patent Application No. 201110001297.X, filed Jan. 5, 2011, which are incorporated herein by reference in their entirety.

TECHNICAL FIELD

The present disclosure relates to technological fields of elastic computing cloud and storage services associated with block devices, and particularly, relates to apparatuses, methods and systems of upgrading an elastic computing cloud system which implements data storage based on a storage service associated with a block device.

BACKGROUND OF THE PRESENT DISCLOSURE

An elastic computing cloud is a computing cloud service which virtualizes a local physical server as multiple virtual servers for use based on virtualization technologies in order to improve resource usage rates and reduce cost. Storage services of virtual servers (i.e., virtual machines) which are virtualized based on an elastic computing cloud technology are block device based remote storage services, which are referred to, in the industry, as elastic block storage.

A remote storage service of a block device is a block-level storage service that is provided based on a block device driver. Local physical servers and/or virtual servers may store data of the servers into a remote storage resource pool in terms of blocks, thereby saving local storage resources. In brief, the remote storage service of the block device provides a service that is similar to a physical hard drive for storing the data of local physical servers and/or virtual servers, and has no limitation on data format and file system format.

Along with the rapid development of the elastic computing cloud technology, the elastic block storage service has a higher criterion for high availability of the remote storage service. Generally, there are tens of thousands of virtual servers that are virtualized based on the elastic computing cloud. These tens of thousands of virtual servers are provided to third parties (such as government departments, traditional large, medium and small sized enterprises, small and medium Internet webmasters, individual users, etc.) for use. A cluster that is formed from multiple virtual servers depends on remote storage services of block devices for operation. The remote storage carries and circulates data of the entire elastic computing cloud system. The availability of the remote storage service is related to the availability of the entire elastic computing cloud system.

When upgrading an elastic computing cloud system that implements data storage based on a remote storage service of a block device, existing technology first needs to notify service users that service will be temporarily unavailable due to an upgrade process, and temporarily suspend services of each virtual server of the entire elastic computing cloud system in order to perform a service upgrade of the storage service (for example, fixing a bug or providing a new function, etc.). After the re-deployed services operate normally, the virtual servers of the entire elastic computing cloud system can be returned to normal operation, thereby completing the upgrade process.

The upgrade process prevents a user from continuing to access a Web page using a Web service provided by a virtual server of the elastic computing cloud system, or forces the user to terminate an ongoing distributed computation if the user uses a virtual server of the elastic computing cloud system to perform the distributed computation.

As can be seen, when existing technology upgrades an elastic computing cloud system which implements data storage based on remote storage services of block devices, the associated upgrade process is very complicated. The upgrade process takes a relatively long period of time and generally requires a couple of hours to complete upgrade operations, thus having a relatively low upgrade efficiency. Furthermore, users may be forced to terminate ongoing transactions during the upgrade process, thus failing to ensure provision of high availability of services to the users and deteriorating usage experience of the users.

SUMMARY OF THE DISCLOSURE

Exemplary embodiments of the present disclosure provide an apparatus, a method and a system of upgrading an elastic computing cloud system which implements data storage based on remote storage of block devices, in order to improve an upgrade efficiency through an online upgrade approach and avoid the problem of poor usage experience of users due to termination of transactions that are currently used by the users during the upgrade.

According to a first aspect of the present disclosure, the exemplary embodiments of the present disclosure provide a server of an elastic computing cloud system which implements data storage based on storage services of block devices. In one embodiment, the server includes a block device driver apparatus and at least one block device service apparatus. The block device driver apparatus is configured to place a received data write/read request in a waiting queue that is maintained in advance for a block device service apparatus in response to receiving the data write/read request corresponding to the block device service apparatus.

Additionally, the block device driver apparatus may further fetch a data write/read request from the waiting queue and transfer the fetched request to a pending queue that is maintained in advance for the block device service apparatus, and send a data write/read request in the pending queue to the block device service apparatus for processing. In response to receiving a processing result from the block device service apparatus for the received data write/read request, the block device driver apparatus may delete the sent data write/read request from the pending queue.

In one embodiment, the block device driver apparatus may stop sending data write/read requests in the pending queue to the block device service apparatus for processing in response to determining that the block device service apparatus will perform a service upgrade, and transfer the data write/read requests in the pending queue back to the waiting queue in response to determining that a service upgrade will be performed or has been completed.

Furthermore, the block device service apparatus may be configured to perform operations of reading and writing corresponding to requested data for a block device storage resource pool based on the data write/read request sent from the block device driver apparatus.

According to a second aspect of the present disclosure, the exemplary embodiments of the present disclosure further provide a method of upgrading an elastic computing cloud system which implements data storage based on storage services associated with block devices. In one embodiment, the method includes placing a received data write/read request in a waiting queue that is maintained in advance for a service associated with a block device each time in response to receiving the data write/read request corresponding to the service associated with the block device. The method may further fetch a data write/read request from the waiting queue and transfer the fetched request to a pending queue that is maintained in advance for the service associated with the block device.

In one embodiment, the method sends a data write/read request in the pending queue to the service associated with the block device for processing, and deletes the sent data write/read request from the pending queue in response to receiving a processing result from the service associated with the block device for the data write/read request received. In some embodiments, the method may stop sending data write/read requests in the pending queue to the service associated with the block device for processing in response to determining that the service associated with the block device will perform a service upgrade, and transfer the data write/read requests in the pending queue back to the waiting queue in response to determining that a service upgrade will be performed or has been completed.

According to a third aspect of the present disclosure, the exemplary embodiments of the present disclosure further provide an apparatus for upgrading an elastic computing cloud system which implements data storage based on storage services associated with block devices. In one embodiment, the apparatus includes a waiting queue maintenance unit configured to place a received data write/read request in a waiting queue that is maintained in advance for a service associated with a block device each time in response to receiving the data write/read request corresponding to the service associated with the block device.

Additionally, the apparatus may further include a pending queue maintenance unit configured to fetch a data write/read request from the waiting queue and transfer the fetched request to a pending queue that is maintained in advance for the service associated with the block device.

In some embodiments, the apparatus may further include a write/read request processing unit configured to send a data write/read request in the pending queue to the service associated with the block device for processing. The write/read request processing unit may further be configured to delete the sent data write/read request from the pending queue in response to receiving a processing result from the service associated with the block device for the data write/read request received. In one embodiment, the write/read request processing unit may stop sending data write/read requests in the pending queue to the service associated with the block device for processing in response to determining that the service associated with the block device will perform a service upgrade, and transfer the data write/read requests in the pending queue back to the waiting queue in response to determining that a service upgrade will be performed or has been completed.

According to a fourth aspect of the present disclosure, the exemplary embodiments of the present disclosure further provide a system for upgrading an elastic computing cloud system which implements data storage based on storage services associated with block devices. In one embodiment, the system may include a storage resource pool configured to store data of the elastic computing cloud system based on the storage services associated with the block devices.

Additionally, the system may further include at least one physical server. The at least one physical server may be configured to place a received data write/read request in a waiting queue that is maintained in advance for a service associated with a block device each time in response to receiving the data write/read request corresponding to the service associated with the block device.

Furthermore, the at least one physical server may fetch a data write/read request from the waiting queue, transfer the fetched request to a pending queue that is maintained in advance for the service associated with the block device, and perform operations of reading and writing corresponding to requested data for the storage resource pool based on the data write/read request in the pending queue.

In some embodiment, the at least one physical server may stop sending data write/read requests in the pending queue to the service associated with the block device for processing in response to determining that the service associated with the block device will perform a service upgrade, and transfer the data write/read requests in the pending queue back to the waiting queue in response to determining that a service upgrade will be performed or has been completed.

In a physical server of an elastic computing cloud system which implements data storage based on a storage service associated with block devices, the technical scheme proposed by the exemplary embodiments of the present disclosure separately maintains two queues for each virtualized service of a block device. One is a waiting queue for data write/read requests and is used for maintaining data write/read requests that are sent to a service associated with a block device and wait for processing. Another one is a pending queue which is used by the physical server for maintaining data write/read requests that are currently processed by the service associated with the block device.

The technical scheme stops processing the data write/read requests that are maintained in the pending queue for the service associated with that block device when the service associated with the block device needs to be upgraded, and puts the data write/read requests that are currently processed in the pending queue back to the waiting queue for re-dispatching, thus realizing completion of processing a service upgrade of a storage service in an elastic computing cloud system without interrupting the storage service. This improves efficiency of service upgrade, avoids interruption of transactions that are currently used by users, and provides services of high availability during an upgrade process, thereby improving usage experience of the users.

DETAILED DESCRIPTION

Due to a lack of hot deployment for realizing an online upgrade in existing technology, when an elastic computing cloud system which implements data storage based on a storage service of a block device is upgraded, each virtual server in the elastic computing cloud system needs to be shut down for service upgrade and re-started upon completing the upgrade. For a storage service provider or a storage service user, this greatly increases maintenance cost and reduces availability of associated services. In view of this problem, the present disclosure proposes an implementation of a hot deployment for a storage service of a block device in an elastic computing cloud system which implements data storage based on storage services of block devices in order to realize online upgrade of the storage service. Specifically, an upgrade of a storage service is performed without interrupting the storage service. Accordingly, the availability of the storage service of the service provider and the transparency of the storage service are improved, allowing the user of the storage service not to concern an upgrade process of the backend service.

The hot deployment of the block device storage service is an online upgrade approach of the block device service. As the block device storage service is based on block device driver technology, a physical server of an elastic computing cloud system includes a service program of a block device driver in a kernel mode. The kernel-mode service program of the block device driver needs to transfer a data write/read request to a user-mode service program of a block device included in the physical server, and the user-mode service program of the block device transfers the write/read request to a remote network storage resource pool or a local physical disk storage resource pool, etc., for processing. The kernel-mode service program of the block device driver is more stable as compared with the user-mode service program of the block device. The user-mode service program of the block device frequently requires version upgrades in order to provide storage service of better quality. Based on the technical scheme provided in the exemplary embodiments of the present disclosure, a service program of a block device driver that can support online upgrades is provided in a physical server of an elastic computing cloud system in order to enhance availability of storage service and improve usage experience of users.

Figure 1:
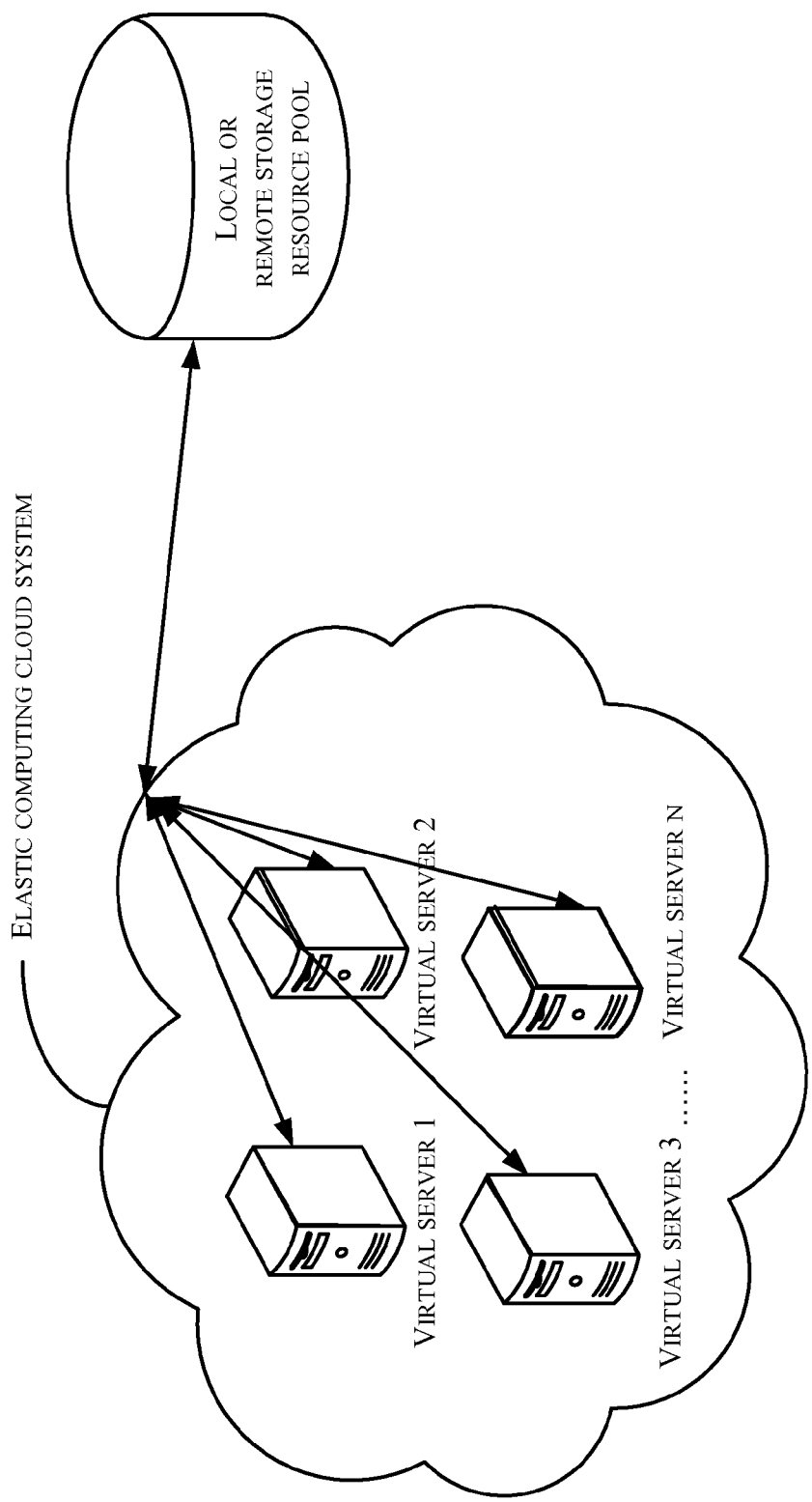
FIG. 1 shows a structural diagram illustrating a topology of an elastic computing cloud system which implements data storage based on storage services of block devices that is used by a technical scheme proposed in accordance with an exemplary embodiment of the present disclosure.

FIG. 1 shows a structural diagram illustrating a topology of an elastic computing cloud system which implements data storage based on storage services of block devices that is used by a technical scheme proposed in accordance with an exemplary embodiment of the present disclosure. The elastic computing cloud system include multiple virtual servers (virtual server 1, virtual server 2, virtual server 3, . . . , virtual server n of FIG. 1) which are virtualized from a local physical server based on the elastic computing cloud technology. Each virtual server implements a data storage service that is locally provided based on a block device storage service technology using a remote storage resource pool or a local storage resource pool. Specifically, each virtual server stores data which needs to be stored locally in a remote storage resource pool or a local storage resource pool, and reads relevant data from the remote storage resource pool or the local storage resource pool when a request for reading the data is present later. As such, each virtual server can share the storage resource pool that is remotely or locally set up without occupying storage resources of the local physical server itself, thus improving resource usage rates of the elastic computing cloud system.

In order to implement the technical scheme provided in the present disclosure, functions of a physical server of the elastic computing cloud system described above need to be improved so as to achieve a goal of performing an online upgrade for a storage service.

Figure 2:
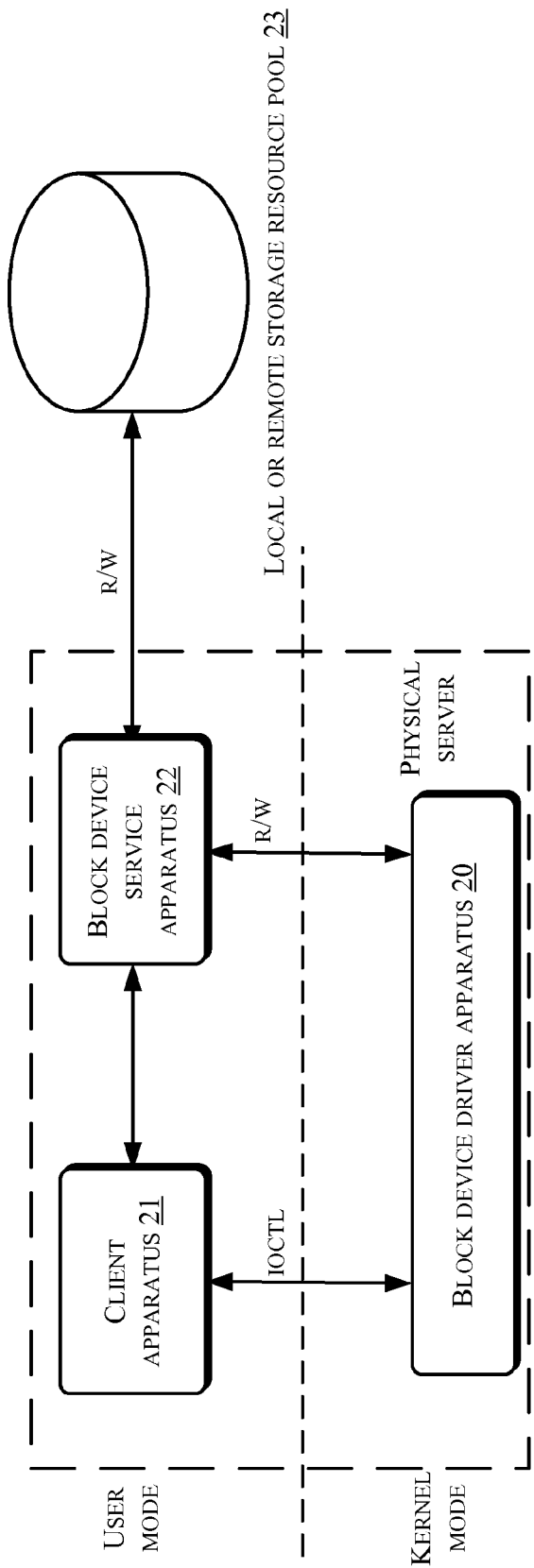
FIG. 2 shows a structural diagram illustrating an improved physical server in accordance with an exemplary embodiment of the present disclosure.

FIG. 2 shows a structural diagram illustrating an improved physical server in accordance with an exemplary embodiment of the present disclosure, and specifically includes a kernel-mode block device driver apparatus 20, a user-mode client apparatus 21 and at least one block device service apparatus 22, and a local or remote storage resource pool 23. The block device driver apparatus 20 may control jobs of multiple block device service apparatuses 22. Each component realizes an online upgrade of a storage service based on the following working principles:

The kernel-mode block device driver apparatus 20 receives a data write/read request from a write/read dispatch layer at a bottom layer of a physical server, and transfers the data write/read request to the user-mode block device service apparatus 22 through a TCP protocol, for example. In order to implement an online upgrade function that supports hot deployment, the block device driver apparatus 20 maintains two queues for each block device service apparatus 22 that is virtualized from the physical server, of which one is a waiting queue. Each time when a data write/read request that corresponds to a certain block device service apparatus 22 is received from the write/read dispatch layer at the bottom layer of the physical server, the block device driver apparatus 20 puts the received write/read request into the waiting queue that is maintained in advance for the block device service apparatus 22 to wait for subsequent processing. Another one is a pending queue. Each time when processing a data write/read request for that block device service apparatus 22, the block device driver apparatus 20 first fetches the data write/read request from the waiting queue that is maintained in advance for the block device service apparatus 22, transfers the request to the pending queue that is maintained in advance for the block device service apparatus 22, and sends the request in the pending queue to the block device service apparatus 22 for processing. As can be seen, all write/read requests in a pending queue are write/read requests that are currently processed by the physical server. After properly completing write/read requests of the pending queue that are sent from the block device driver apparatus 20, the block device service apparatus 22 sends results of proper processing to the block device driver apparatus 20. In response to receiving the results of proper processing, the block device driver apparatus 20 removes the write/read requests that have been sent and completely processed from the pending queue, processes other write/read requests in the pending queue, and so forth. Later, in response to determining that the block device service apparatus 22 will perform a service upgrade, the block device driver apparatus 20 stops sending data write/read requests in the pending queue that are maintained for that block device service apparatus 22 to that block device service apparatus 22. Further, upon determining that a service upgrade will be performed or has been completed, the block device driver apparatus 20 adds the data write/read requests in the pending queue that is maintained in advance for the block device service apparatus 22 back to the waiting queue that is maintained in advance for the block device service apparatus 22 to wait for subsequent re-dispatching and processing.

Preferably, the block device driver apparatus 20 can determine whether the block device service apparatus 22 will perform an upgrade operation or has completed an upgrade by examining whether a TCP communication connection between itself and the block device service apparatus 22 is normal. If the TCP communication connection between the block device driver apparatus 20 and the block device service apparatus 22 is disconnected, the block device driver apparatus 20 may determine that the block device service apparatus 22 will perform a service upgrade. If the TCP communication connection between the block device driver apparatus 20 and the block device service apparatus 22 is restored for connection, the block device driver apparatus 20 may determine that a service upgrade of the block device service apparatus 22 has been completed.

The user-mode block device service apparatus 22 receives a data write/read request sent from the block device driver apparatus 20 through, for example, a TCP protocol. Specifically, the user-mode block device service apparatus 22 receives a data write/read request processed by the block device driver apparatus 20 in a pending queue that is maintained in advance for the block device service apparatus 22. Upon receiving the write/read request, the user-mode block device service apparatus 22 performs an analysis operation on the request, analyzing (including verifying) whether the write/read request is legitimate, whether it is a read request or a writing request, starting position and length information of the write/read request, etc., and performs a reading or writing operation on the local or remote storage resource pool based on an analysis result. If the request is a read request, the user-mode block device service apparatus 22 reads requested data from the local or remote storage resource pool 23, and returns the read data and a processing result to the kernel-mode block device driver apparatus 20 through, for example, a TCP protocol. If the request is a write request, the user-mode block device service apparatus 22 stores data that is requested to be written into the local or remote storage resource pool 23, and returns a processing result of the write request to the kernel-mode block device driver apparatus 20 through the TCP protocol, for example.

The user-mode client apparatus 21 may control each block device service apparatus 22 to start or stop a job through the kernel-mode block device driver apparatus 20. When controlling the block device service apparatus 22 for starting a job, the client apparatus 21 first establishes a TCP connection with the block device service apparatus after the user initiates a creation of a request for a block device service through the client apparatus 21, and transmits the created TCP socket handle to the block device driver apparatus 20 through an ioctl command. Thereafter, the client apparatus 21 may close the TCP socket. As such, the client apparatus 21 realizes a TCP connection between the kernel-mode block device driver apparatus 20 and the user-mode block device service apparatus 22. All subsequent data write/read requests that are sent to the block device driver apparatus 20 may be sent to the block device service apparatus 22 through the TCP connection. When controlling the block device service apparatus 22 to stop a job, the client apparatus 21 sends a stop request to the block device driver apparatus 20 through an ioctl command after the user initiates a request for stopping a block device service through the client apparatus 21. Upon receiving the request, the block device driver apparatus 20 first sends the stop request to the block device service apparatus 22. In response to receiving this request, the block device service apparatus 22 safely quits upon closing the TCP socket. After receiving a stop response from the block device service apparatus 22, the block device driver apparatus 20 stops processing write/read requests in associated pending queue. As a result, the block device service apparatus 22 stops operation. When the block device service apparatus 22 is in a process of upgrading, the client apparatus 21 may try to establish a TCP link with the block device service apparatus 22 every second. If a new TCP link is successfully established, which indicates that the block device service apparatus 22 has been upgraded successfully, the client apparatus 21 transmits a newly created TCP socket handle to the block device driver apparatus 20 through an ioctl command. As such, after the block device service apparatus 22 has been upgraded, the block device driver apparatus 20 and the block device service apparatus 22 establish a new TCP link for communicating data write/read requests.

The client apparatus 21 may be an optional component of the physical server in the present disclosure. Other than using the client apparatus 21 for realizing user control of an operating mode of the user-mode block device service apparatus 22, other trigger mechanisms such as a timing function, an event trigger function, etc., may be used to automatically control the operating mode of the user-mode block device service apparatus 22.

Generally, the local or remote storage resource pool 23 is a storage server of a distributed file system or the like. This resource pool 23 may be deployed locally or remotely, and in most cases is a storage resource pool that is remotely deployed. The storage resource pool 23 stores service data of each virtual server of the elastic computing cloud system. Specifically, when receiving a data read request from a certain block device service apparatus 22 of the physical server, the storage resource pool 23 reads data relevant to the request therefrom and feedbacks the read data to the block device service apparatus 22. When receiving a data write request from a certain block device service apparatus 22 of the physical server, the storage resource pool 23 stores therein data that is requested to be written.

Figure 3:
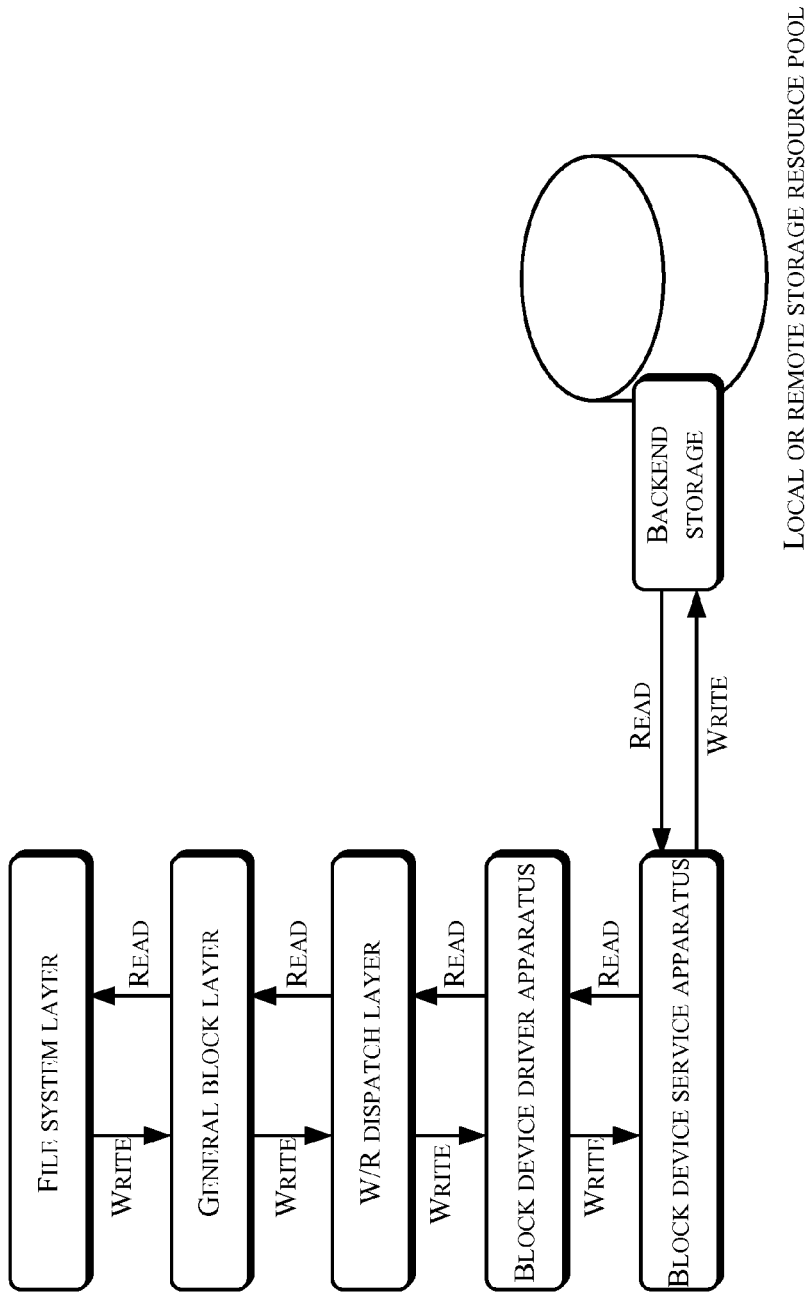
FIG. 3 shows a flow chart illustrating an internal process of an improved physical server for reading and writing data in a local or a remote storage resource pool in accordance with an exemplary embodiment of the present disclosure.

FIG. 3 shows a flow chart illustrating an internal process of an improved physical server for reading and writing data in a local or a remote storage resource pool in accordance with an exemplary embodiment of the present disclosure. In one embodiment, a process of data reading may include the following:

After a file system layer of a local physical server sends a data read request of a certain block device service apparatus to the block device driver apparatus through a general block layer and a W/R dispatch layer, the block device driver apparatus places the request in a waiting queue that is maintained in advance for the block device service apparatus to wait for subsequent processing, fetches the data read request from the waiting queue into a pending queue that is maintained in advance for the block device service apparatus subsequently, and processes the read request, i.e., sending the read request to the block device service apparatus. The block device service apparatus reads data relevant to the request from a storage pool according to the read request, and returns a reading result to the block device driver apparatus through a TCP connection. The block device driver apparatus transmits the reading result to the file system layer through the general block layer and the W/R dispatch layer, and the file system layer returns the reading result to the system for dispatching.

In one embodiment, a process of data writing may include the following:

The local physical server stores the data writing request and data that is requested to be written into the block device driver apparatus through the file system layer, the general block layer and the W/R dispatch layer that are called by the system. The block device driver apparatus places the write request in a waiting queue that is maintained in advance for the block device service apparatus to wait for subsequent processing, fetches the data write request from the waiting queue subsequently, places the request to a pending queue that is maintained in advance for the block device service apparatus, and processes the write request, i.e., sending the data write request and the data to be written to the block device service apparatus. The block device service apparatus analyzes the data write request to achieve storing of the data to be written in a storage resource pool.

Figure 4:
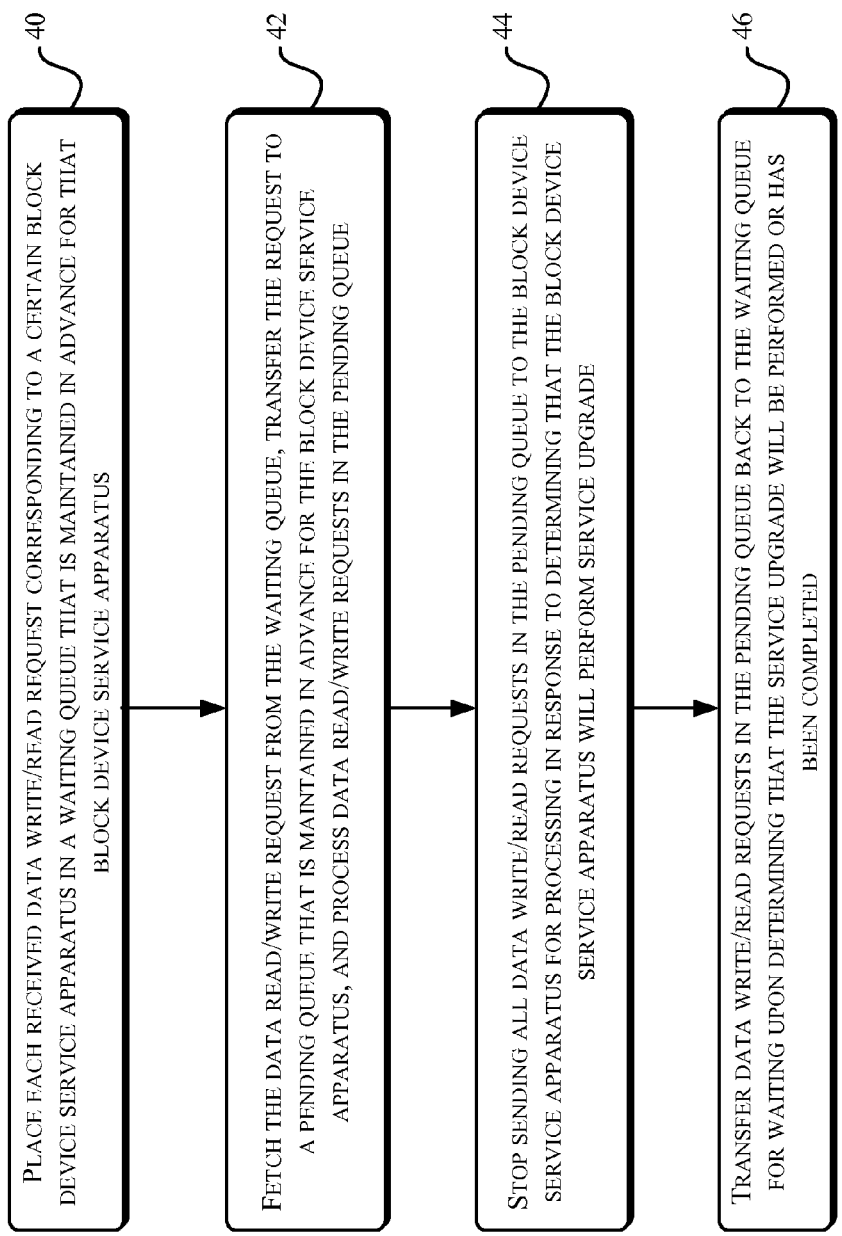
FIG. 4 shows a flow chart illustrating details of operations of a block device driver apparatus in an improved physical server in accordance with an exemplary embodiment of the present disclosure.

FIG. 4 shows a flow chart illustrating details of operations of a block device driver apparatus in an improved physical server in accordance with an exemplary embodiment of the present disclosure. The block device driver apparatus maintains two queues for each block device service apparatus respectively, one queue being a waiting queue, used for placing therein a data write/read request that is sent to and wait for processing by a corresponding block device service apparatus and entering the request into a state of queuing that waits for processing, and another queue being a pending queue, used for placing therein a data write/read request that is currently processed by a corresponding block device service application. Based on these two maintained queues, specific working principles of the block device driver apparatus are as follows:

At 40, each time when receiving a data write/read request corresponding to a certain block device service apparatus from a bottom layer of a physical server, the block device driver apparatus places the received data write/read request in a waiting queue that is maintained in advance for that block device service apparatus for waiting.

At 42, when processing a data write/read request that corresponds to the block device service apparatus, the block device driver apparatus first fetches the data write/read request from the waiting queue and transfers the request to a pending queue that is maintained in advance for the block device service apparatus, sends a data write/read request in the pending queue to the user-mode block device service apparatus for processing, and deletes the sent data write/read request from the pending queue in response to receiving a proper processing result of the received data write/read request from the block device service apparatus.

At 44, in response to determining that the block device service apparatus will perform a service upgrade, the block device driver apparatus stops sending all data write/read requests in the pending queue to the block device service apparatus for processing.

At 46, upon determining that a service upgrade will be performed or has been completed, the block device driver apparatus transfers data write/read requests in the pending queue back to the waiting queue to wait for subsequent re-dispatching and processing. Specifically, the block device driver apparatus may determine whether the block device service apparatus will perform a service upgrade or has completed a service upgrade by examining a status of a communication connection between itself and the block device service apparatus. More specifically, in response to detecting that the communication connection between itself and the block device service apparatus is disconnected, the block device driver apparatus may determine that the block device service apparatus will perform a service upgrade. Further, in response to detecting that the communication connection between itself and the block device service apparatus is restored, the block device driver apparatus may determine that the block device service apparatus has completed the service upgrade.

Figure 5:
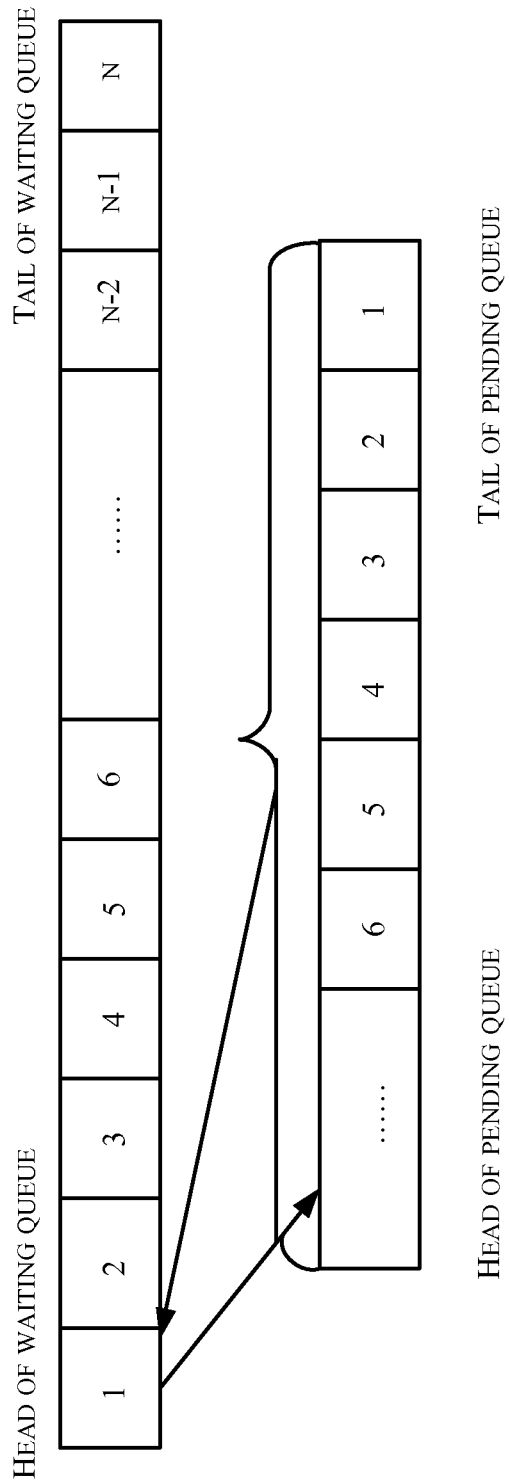
FIG. 5 shows a schematic diagram illustrating a process of a block device driver apparatus of an improved physical server to perform dispatching for a waiting queue and a pending queue maintained thereby before or after a service upgrade of a block device service apparatus in accordance with an exemplary embodiment of the present disclosure.

FIG. 5 shows a schematic diagram illustrating a process of a block device driver apparatus of an improved physical server to perform dispatching for a waiting queue and a pending queue maintained thereby before or after a service upgrade of a block device service apparatus in accordance with an exemplary embodiment of the present disclosure. In order to support hot deployment (i.e., online upgrades) of the block device service apparatus, the kernel-mode block device driver apparatus needs to maintain data write/read requests that are received. The block device driver apparatus uses two data reading and writing queues respectively for each block device service apparatus to maintain statuses of write/read requests. One is a waiting queue, used for maintaining W/R requests that are sent from a W/R dispatch layer in a physical server for each block device service apparatus, these requests lining up in the waiting queue to wait for subsequent processing by the block device driver apparatus. Another one is a pending queue, used for maintaining W/R requests that are currently processed by the block device driver apparatus for each block device service apparatus. These W/R requests in the pending queue have not been processed completely, and may be in a state in which the block device driver apparatus waits for a processing response of a corresponding block device service apparatus. When a certain block device service apparatus is not performing a service upgrade, the block device driver apparatus first fetches a W/R request from the head of a waiting queue that is maintained in advance for the block device service apparatus when processing W/R requests, deletes the fetched W/R request from the waiting queue, places the W/R request into the head of a pending queue that is maintained in advance for the block device service apparatus, sends each W/R request in the pending queue to the block device service apparatus for processing, deletes the sent W/R requests from the pending queue after receiving a proper processing result of the data write/read requests received from the block device service apparatus. When the block device service apparatus needs to have a service upgrade, the block device driver apparatus stops sending the W/R requests in the pending queue to the block device service apparatus for processing, i.e., stopping to send new W/R requests to the block device service apparatus. After the block device service apparatus performs the upgrade or has completed the upgrade, the block device driver apparatus places all W/R requests (such as requests 1, 2, 3, 4, 5, 6, . . . as shown in FIG. 5) that are within a corresponding pending queue back to a corresponding waiting queue for subsequent re-dispatching by the block device driver apparatus.

As can be seen, by adding a block device driver apparatus in the physical server of the elastic computing cloud system and dispatching by the block device driver apparatus through two queues that are maintained in advance for each block device service apparatus, a service upgrade of a backend storage service may be completed without interrupting the provision of the storage service to data storage users, thus improving the availability of the data storage in the elastic computing cloud system. Furthermore, the aforementioned scheme is transparent to the users such that the data storage users can barely sense any effect on the transactions of data storage due to a service upgrade of the storage service, thus improving usage experience of the users.

Figure 6:
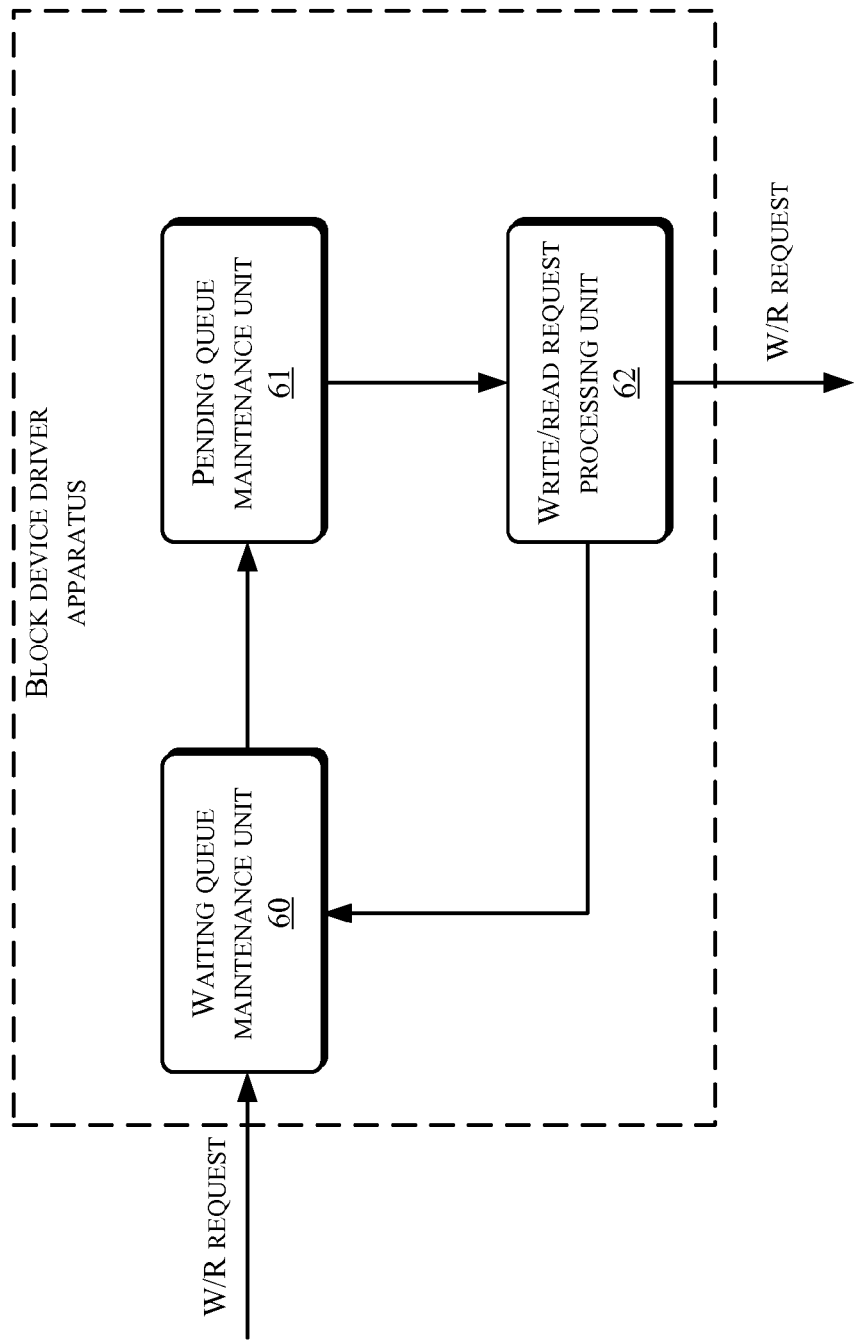
FIG. 6 shows a structural diagram illustrating a new block device driver apparatus of an improved server in accordance with an exemplary embodiment of the present disclosure.

Correspondingly, FIG. 6 shows a structural diagram illustrating a new block device driver apparatus of an improved server in accordance with an exemplary embodiment of the present disclosure. In one embodiment, the apparatus may include a waiting queue maintenance unit 60, used for separately maintaining, for each block device service apparatus, a waiting queue into which a data write/read request for respective block device service apparatus is placed to be entered into a state of queuing that waits for processing. Additionally, the apparatus may further include a pending queue maintenance unit 61, used for separately maintaining, for each block device service apparatus, another pending queue into which a data write/read request for respective block device service apparatus that is currently processed is placed.

Specifically, a data write/read request is fetched from a waiting queue that is maintained in advance by the waiting queue maintenance unit 60 for a certain block device service apparatus and moved to a pending queue that is maintained for that block device service apparatus. Specifically, the pending queue maintenance unit 61 may fetch a data write/read request from the head of a corresponding waiting queue, delete the fetched data write/read request from the waiting queue, and transfer the fetched data write/read request to the head of a corresponding pending queue that is maintained in advance.

In some embodiments, the apparatus may further include a write/read request processing unit 62. The write/read request processing unit 62 may be used for sending data write/read requests in corresponding pending queue maintained by the pending queue maintenance unit 61 to the block device service apparatus for processing. Furthermore, the write/read request processing unit 62 may delete the sent data write/read requests from the pending queue in response to receiving a proper processing result of the data write/read request received from the block device service apparatus, and stop to send data write/read requests in the pending queue to the block device service apparatus for processing in response to determining that the block device service apparatus will perform a service upgrade.

In some embodiments, the write/read request processing unit 62 may further transfer the data write/read requests in the pending array back to corresponding waiting queue for waiting to be re-dispatched subsequently by the write/read request processing unit 62 in response to determining that a service upgrade will be performed or has been completed. Specifically, the write/read request processing unit 62 may, through examining a status of communication connection between the block device driver apparatus and a block device service apparatus, to determine that the block device service apparatus will perform a service upgrade in response to detecting a disconnection of the communication connection, and determine that the block device service apparatus has completed a service upgrade in response to detecting that the communication connection is restored.

Figure 7:
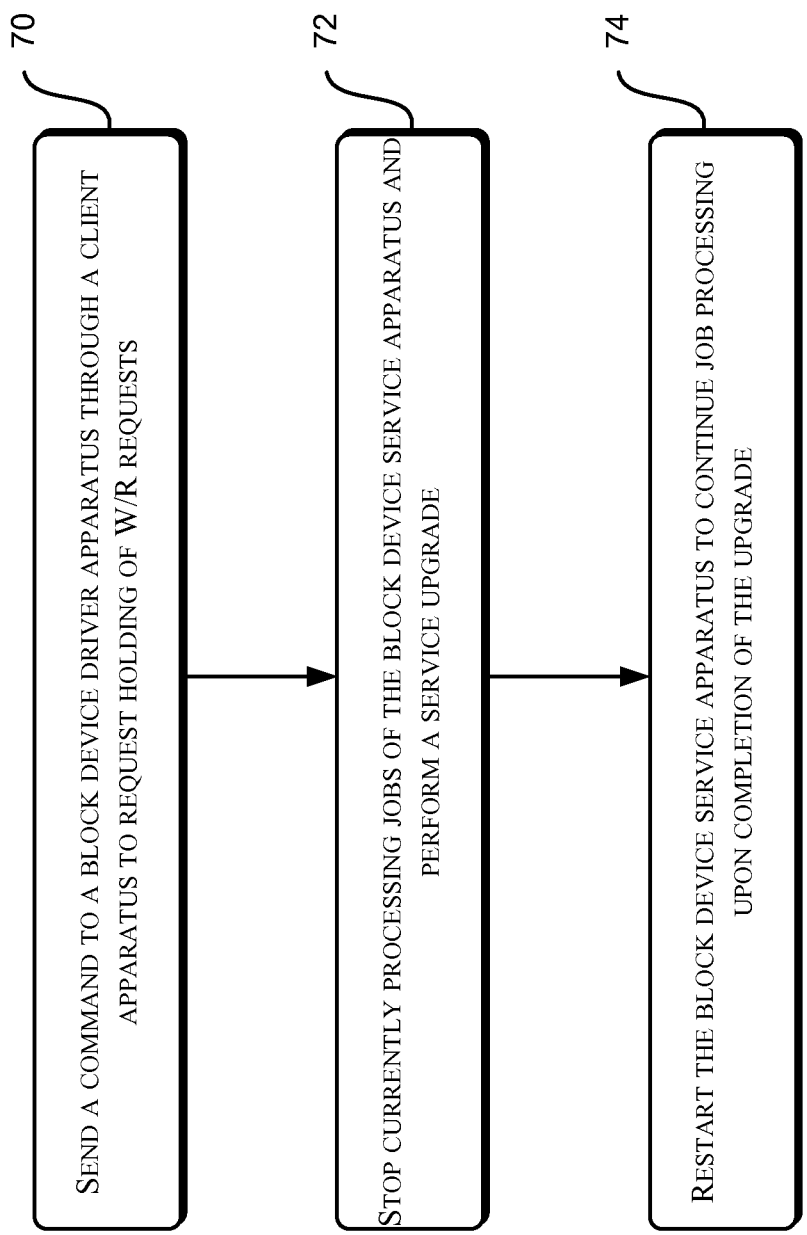
FIG. 7 shows a schematic diagram illustrating operations controlling a block device driver apparatus of a physical server when performing a service upgrade of a server in accordance with an exemplary embodiment of the present disclosure.

FIG. 7 shows a schematic diagram illustrating operations controlling a block device driver apparatus of a physical server when performing a service upgrade of a server in accordance with an exemplary embodiment of the present disclosure. Specifically, a process of operations includes:

At 70, prior to an upgrade of a storage service, an upgrade maintenance personnel sends an ioctl command to a kernel-mode block device driver apparatus through a user-mode client apparatus to instruct the block device driver apparatus to hold all W/R requests.

At 72, the upgrade maintenance personnel thereafter performs a service upgrade (the service upgrade including stopping service, upgrading service programs, publishing new services, etc.) for the storage service using a normal upgrade process. As such, a hot deployment for performing an online service upgrade to the storage service is completed. During the process of hot deployment, the block device driver apparatus holds all the W/R requests.

At 74, upon the deployment, the block device driver apparatus releases all the W/R requests and the data storage service will continue processing.

One skilled in the art should understand that the exemplary embodiments of the present disclosure can be provided as methods, apparatuses (devices), or computer program products. Therefore, the present disclosure may be implemented in terms of hardware only, software only, or a combination of hardware and software. Furthermore, the present disclosure may be implemented in a form of a computer program product having one or more computer storage media including computer-executable instructions (including, but not limited to, disk storage, CD-ROM, optical disks, etc.).

The present disclosure is described with reference to flow charts and/or block diagrams of the exemplary method, apparatus (device) and computer program product. It should be understood that each flow and/or block and a combination of flows and/or blocks of the flow charts and/or block diagrams may be implemented by computer program instructions. These computer program instructions may be provided to general computers, specialized computers, embedded processors or other programmable data processors to generate a machine, in order to create an apparatus implementing designated functions within one or more flows of the flow charts and/or one or more blocks of the block diagrams through executing instructions by a computer or other programmable data processors.

These computer program instructions may alternatively be stored in computer-readable storage which can instruct a computer or other programmable data processors to operate in a specific way, so that the instructions stored in the computer-readable storage generate a product including an instruction apparatus. The instruction apparatus implements designated functions in one or more flows of the flow charts and/or one or more blocks of the block diagrams.

These computer program instructions may alternatively be loaded in a computer or other programmable data processors, so that the computer or other programmable data processors can perform a series of operation acts to generate a computer-implemented process. Accordingly, instructions executed in the computer or other programmable data processors can provide acts for implementing designated functions in one or more flows of the flow charts and/or one or more blocks of the block diagrams.

Figure 8:
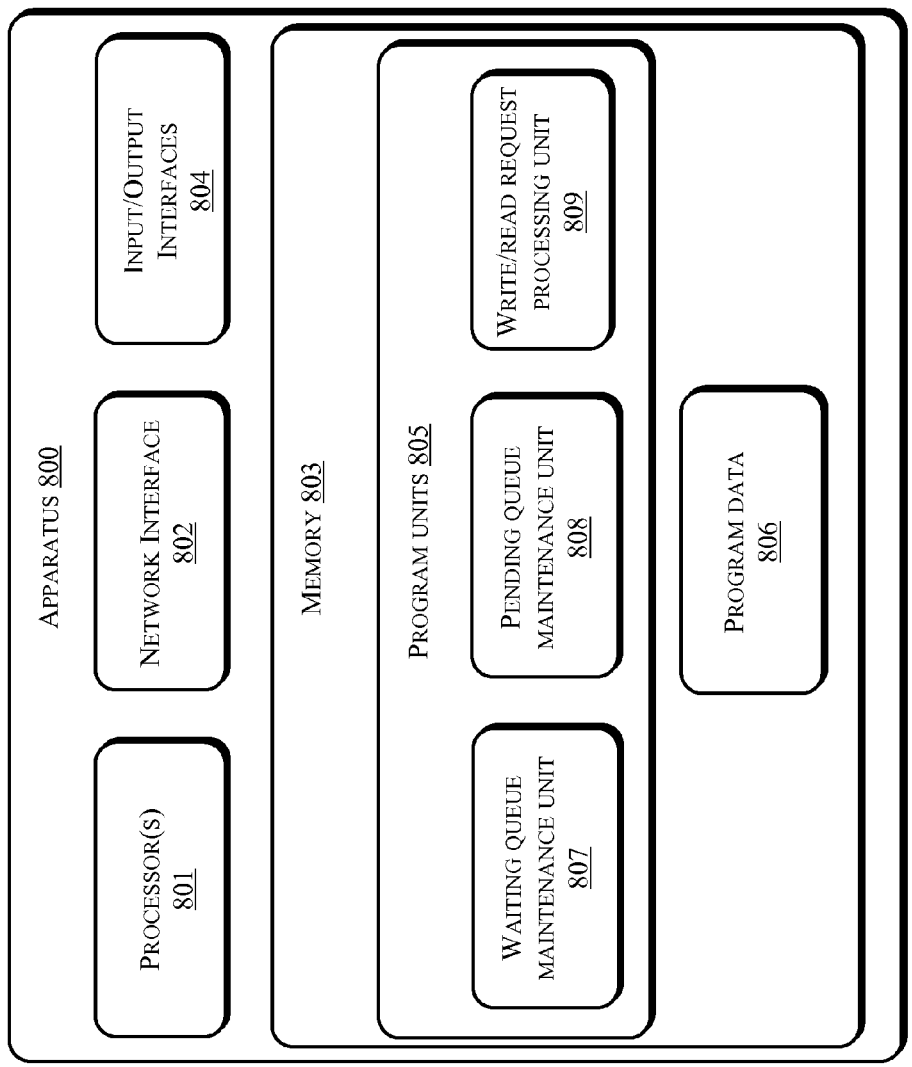
FIG. 8 shows the exemplary apparatus described in FIG. 6 in more detail.

For example, FIG. 8 illustrates an exemplary apparatus 800, such as the apparatus as described above, in more detail. In one embodiment, the apparatus 800 can include, but is not limited to, one or more processors 801, a network interface 802, memory 803, and an input/output interface 804.

The memory 803 may include computer-readable media in the form of volatile memory, such as random-access memory (RAM) and/or non-volatile memory, such as read only memory (ROM) or flash RAM. The memory 803 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 803 may include program units 805 and program data 806. In one embodiment, the program units 805 may include a waiting queue maintenance unit 807, a pending queue maintenance unit 808 and a write/read request processing unit 809. Details about these program units may be found in the foregoing embodiments described above.

Although preferred embodiments of the present disclosure are described, one skilled in the art can perform additional alterations and modifications to these embodiments once understanding the fundamental creative concept. Accordingly, it is intended that the claims covers all modifications and variations which fall within the scope of the claims of the present disclosure and preferred embodiments.

One skilled in the art can alter or modify the disclosed method, system and apparatus in many different ways without departing from the spirit and the scope of this disclosure. Accordingly, it is intended that the present disclosure covers all modifications and variations which fall within the scope of the claims of the present disclosure and their equivalents.

What is claimed is:

1. A server of an elastic computing cloud system which implements data storage based on storage services associated with block devices, comprising a block device driver apparatus and at least one block device service apparatus, wherein:
   the block device driver apparatus is configured to:
      place a received data write/read request in a waiting queue that is maintained in advance for a block device service apparatus in response to receiving the data write/read request corresponding to the block device service apparatus,
      fetch a data write/read request from the waiting queue and transfer the fetched request to a pending queue that is maintained in advance for the block device service apparatus,
      send a data write/read request in the pending queue to the block device service apparatus for processing,
      delete the sent data write/read request from the pending queue in response to receiving a processing result from the block device service apparatus for the data write/read request received,
      stop sending data write/read requests in the pending queue to the block device service apparatus for processing in response to determining that the block device service apparatus will perform a service upgrade, and
      transfer the data write/read requests in the pending queue back to the waiting queue in response to determining that a service upgrade will be performed or has been completed; and
   the block device service apparatus is configured to:
      perform operations of reading and writing corresponding to requested data for a block device storage resource pool based on the data write/read request sent from the block device driver apparatus.

2. The server as recited in claim 1, further comprising a client apparatus configured to:
   control starting of the block device service apparatus, and upon starting, establish a communication connection between the block device driver apparatus and the started block device service apparatus.

3. The server as recited in claim 2, wherein the client apparatus is further configured to:
   control stopping of the block device service apparatus, and upon stopping, remove the communication connection between the block device driver apparatus and the stopped block device service apparatus.

4. The server as recited in claim 1, wherein the block device driver apparatus is further configured to examine a communication connection with the block device service apparatus.

5. The server as recited in claim 4, wherein the block device driver apparatus is further configured to determine that the block device service apparatus will perform a service upgrade in response to determining that the communication connection with the block device service apparatus is disconnected.

6. The server as recited in claim 4, wherein the block device driver apparatus is further configured to determine that the block device service apparatus has completed the service upgrade in response to determining that the communication connection with the block device service apparatus is restored for connection.

7. A method of upgrading an elastic computing cloud system which implements data storage based on storage services associated with block devices, the method comprising:
   placing a received data write/read request in a waiting queue that is maintained in advance for a service associated with a block device each time in response to receiving the data write/read request corresponding to the service associated with the block device;
   fetching a data write/read request from the waiting queue and transferring the fetched request to a pending queue that is maintained in advance for the service associated with the block device, sending a data write/read request in the pending queue to the service associated with the block device for processing, and deleting the sent data write/read request from the pending queue in response to receiving a processing result from the service associated with the block device for the data write/read request received;
   stopping sending data write/read requests in the pending queue to the service associated with the block device for processing in response to determining that the service associated with the block device will perform a service upgrade; and
   transferring the data write/read requests in the pending queue back to the waiting queue in response to determining that a service upgrade will be performed or has been completed.

8. The method as recited in claim 7, wherein determining that a service upgrade will be performed or has been completed comprises examining a communication connection with the service associated with the block device.

9. The method as recited in claim 8, wherein determining that a service upgrade will be performed or has been completed further comprises determining that the block device service apparatus will perform a service upgrade in response to determining that the communication connection with the block device service apparatus is disconnected.

10. The method as recited in claim 8, wherein determining that a service upgrade will be performed or has been completed further comprises determining that the block device service apparatus has completed the service upgrade in response to determining that the communication connection with the block device service apparatus is restored for connection.

11. The method as recited in claim 7, wherein fetching a data write/read request from the waiting queue and transferring the fetched request to a pending queue that is maintained in advance for the service associated with the block device comprises:
- fetching the data write/read request from a head of the waiting queue;
- deleting the fetched data write/read request from the waiting queue; and
- transferring the fetched data write/read request to the pending queue that is maintained in advance.

12. An apparatus of upgrading an elastic computing cloud system which implements data storage based on storage services associated with block devices, the apparatus comprising:
- a waiting queue maintenance unit configured to place a received data write/read request in a waiting queue that is maintained in advance for a service associated with a block device each time in response to receiving the data write/read request corresponding to the service associated with the block device;
- a pending queue maintenance unit configured to fetch a data write/read request from the waiting queue and transfer the fetched request to a pending queue that is maintained in advance for the service associated with the block device;
- a write/read request processing unit configured to:
  - send a data write/read request in the pending queue to the service associated with the block device for processing,
  - delete the sent data write/read request from the pending queue in response to receiving a processing result from the service associated with the block device for the data write/read request received,
  - stop sending data write/read requests in the pending queue to the service associated with the block device for processing in response to determining that the service associated with the block device will perform a service upgrade, and
  - transfer the data write/read requests in the pending queue back to the waiting queue in response to determining that a service upgrade will be performed or has been completed.

13. The apparatus as recited in claim 12, wherein the write/read request processing unit is further configured to examine a communication connection between the apparatus and the block device service apparatus.

14. The apparatus as recited in claim 13, wherein the write/read request processing unit is further configured to determine that the block device service apparatus will perform a service upgrade in response to determining that the communication connection is disconnected.

15. The apparatus as recited in claim 13, wherein the write/read request processing unit is further configured to determine that the block device service apparatus has completed the service upgrade in response to determining that the communication connection is restored.

16. The apparatus as recited in claim 12, wherein the pending queue maintenance unit fetches the data write/read request from a head of the waiting queue, deletes the fetched data write/read request from the waiting queue, and transfers the fetched data write/read request to the pending queue that is maintained in advance.

17. An elastic computing cloud system which implements data storage based on storage services associated with block devices, the elastic computing cloud system comprising:
- a storage resource pool configured to store data of the elastic computing cloud system based on the storage services associated with the block devices; and
- at least one physical server configured to:
  - place a received data write/read request in a waiting queue that is maintained in advance for a service associated with a block device each time in response to receiving the data write/read request corresponding to the service associated with the block device,
  - fetch a data write/read request from the waiting queue and transfer the fetched request to a pending queue that is maintained in advance for the service associated with the block device,
  - perform operations of reading and writing corresponding to requested data for the storage resource pool based on the data write/read request in the pending queue,
  - stop sending data write/read requests in the pending queue to the service associated with the block device for processing in response to determining that the service associated with the block device will perform a service upgrade, and
  - transfer the data write/read requests in the pending queue back to the waiting queue in response to determining that a service upgrade will be performed or has been completed.

18. The system as recited in claim 17, wherein the storage resource pool is locally deployed with the at least one physical server.

19. The system as recited in claim 17, wherein the storage resource pool is remotely deployed from the at least one physical server.

20. The system as recited in claim 17, wherein the at least one physical server is further configured to remove the fetched data write/read request from the waiting queue in response to transferring the fetched data write/read request to the pending queue.

* * * * *